(12) United States Patent
Mazumdar et al.

(10) Patent No.: US 9,533,899 B2
(45) Date of Patent: Jan. 3, 2017

(54) GASIFICATION WASTE WATER TREATMENT USING AIR SEPARATION UNIT OXYGEN

(71) Applicant: General Electric Company, Schenectady, NY (US)

(72) Inventors: Anindra Mazumdar, Katy, TX (US); Dinh-Cuong Vuong, Houston, TX (US); James Scott Kain, Houston, TX (US); Paul Roberts Scarboro, Houston, TX (US)

(73) Assignee: General Electric Company, Schenectady, NY (US)

( * ) Notice: Subject to any disclaimer, the term of this patent is extended or adjusted under 35 U.S.C. 154(b) by 344 days.

(21) Appl. No.: 13/798,033

(22) Filed: Mar. 12, 2013

(65) Prior Publication Data
US 2014/0263045 A1 Sep. 18, 2014

(51) Int. Cl.
*C02F 3/02* (2006.01)
*C02F 3/00* (2006.01)
(Continued)

(52) U.S. Cl.
CPC ............... *C02F 3/006* (2013.01); *C02F 1/727* (2013.01); *C02F 3/02* (2013.01); *C02F 9/00* (2013.01); *C10J 3/723* (2013.01); *C10K 1/10* (2013.01); *C10K 1/101* (2013.01); *C02F 1/444* (2013.01); *C02F 3/06* (2013.01); *C02F 3/1273* (2013.01); *C02F 2103/18* (2013.01); *C02F 2209/001* (2013.01); *C02F 2209/005* (2013.01); *C02F 2209/02* (2013.01); *C02F 2209/08* (2013.01); *C02F 2209/22* (2013.01); *C10J 2300/0913* (2013.01); *C10J 2300/0923* (2013.01); *C10J 2300/0959* (2013.01); *C10J 2300/169* (2013.01); *C10J 2300/1653* (2013.01);
(Continued)

(58) Field of Classification Search
CPC ......... C02F 9/00; C02F 1/20; C02F 2103/365; C02F 1/444; C02F 1/72; C02F 3/1273; C02F 3/20; C02F 3/26; C10J 2300/1678; C10J 2300/169; C10J 2300/16
USPC ................................. 210/157, 627, 721, 614
See application file for complete search history.

(56) References Cited

U.S. PATENT DOCUMENTS 4,009,105 A 2/1977 Jeris
4,655,918 A 4/1987 Eertink
(Continued)

FOREIGN PATENT DOCUMENTS

WO 2011097094 A1 8/2011

OTHER PUBLICATIONS

PCT Search Report and Written Opinion issued May 15, 2014 in connection with corresponding PCT Patent Application No. PCT/US2014/017097.
(Continued)

*Primary Examiner* — Nam Nguyen
*Assistant Examiner* — Claire Norris
(74) *Attorney, Agent, or Firm* — Fletcher Yoder, P.C.

(57) ABSTRACT

In one embodiment, a method includes gasifying a fuel source using a first oxygen stream supplied from an air separation unit (ASU), discharging a gasifier blowdown from a gasification and scrubbing system configured to gasify the fuel source, generating a grey water from the gasifier blowdown, and biologically treating the grey water in a reactor using a second oxygen stream supplied by the ASU.

17 Claims, 5 Drawing Sheets

(51) Int. Cl.
*C02F 1/72* (2006.01)
*C02F 9/00* (2006.01)
*C10K 1/10* (2006.01)
*C10J 3/72* (2006.01)
*C02F 1/44* (2006.01)
*C02F 3/06* (2006.01)
*C02F 3/12* (2006.01)
*C02F 103/18* (2006.01)

(52) U.S. Cl.
CPC ............... *C10J 2300/1678* (2013.01); *C10J 2300/1681* (2013.01); *C10J 2300/1807* (2013.01); *Y02E 20/18* (2013.01); *Y02W 10/15* (2015.05)

(56) References Cited

U.S. PATENT DOCUMENTS

| | | | |
|---|---|---|---|
| 6,521,365 | B1 | 2/2003 | Song |
| 6,918,253 | B2 | 7/2005 | Fassbender |
| 7,699,986 | B2 | 4/2010 | Novak et al. |
| 8,048,311 | B2 | 11/2011 | Wallace et al. |
| 2002/0121478 | A1* | 9/2002 | Bingley ............ 210/605 |
| 2005/0234278 | A1 | 10/2005 | Van Egmond et al. |
| 2009/0050562 | A1 | 2/2009 | Novak et al. |
| 2010/0044318 | A1* | 2/2010 | Stanton et al. ............ 210/742 |
| 2010/0317749 | A1 | 12/2010 | Kukkonen et al. |
| 2011/0108405 | A1 | 5/2011 | Bommareddy et al. |
| 2011/0186489 | A1* | 8/2011 | Kain et al. ............ 210/151 |

OTHER PUBLICATIONS

Wilcox, E.A.; Oxygen Activated Sludge Wastewater Treatment Systems; EPA Technology Transfer Seminar Publication; Aug. 1973; New York, NY.
Morin, Andrew L.; High Purity Oxygen Biological Nutrient Removal (BNR); Belco Technologies, Inc.; Peekskill, NY.
McCarthy, Dave; Air Products—ASU/IGCC Integration Strategies; Oct. 5, 2009; Colorado Springs, CO.
Oxygen—The Breath of Life (Aerobic Wastewater Engineering with SOLVOX); SOLVOX; pp. 2-12.
The Solvox Process.; Industrial Wastewater Treatment; The Linde Group; 2002; Murray Hill, New Jersey.
The Solvox—B Process; Transferring Pure Oxygen Through Diffuser Hoses; The Linde Group; Murray Hill, New Jersey, 2011.
Design of Facilities for the Biological Treatment of Wastewater; p. 576-577.
Davies, Peter Spencer Ph.D; The Biological Basis of Wastewater Treatment; Strathkelvin Instruments Ltd.; p. 1-20; 2005; Glasgow UK.

* cited by examiner

GASIFICATION WASTE WATER TREATMENT USING AIR SEPARATION UNIT OXYGEN

BACKGROUND OF THE INVENTION

The subject matter disclosed herein relates generally to gasification processes, and the treatment of grey water produced in gasification processes.

Fossil fuels, such as solid coal, liquid petroleum, or biomass, may be gasified for use in the production of electricity, chemicals, synthetic fuels, or for a variety of other applications. Gasification involves reacting a carbonaceous fuel and oxygen at a very high temperature to produce synthesis gas, commonly referred to as syngas, which is a fuel containing carbon monoxide and hydrogen. Syngas combusts more efficiently and cleaner than the fuel in its original state before gasification.

One byproduct of the gasification process is grey water. Grey water may include fine particles of ash, metals, ammonia, and organic matter. Unfortunately, some of these by-products are undesirable for a number of reasons. For example, solids in the grey water and/or certain corrosive materials in the grey water can have detrimental effects on plant equipment (e.g., piping, valves) and, therefore, affect the overall operation of the plant. Furthermore, it may be desirable to maintain the concentration of certain of the gasification by-products below a certain level in the grey water prior to discharge from, or re-use within, the plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification and scrubbing system configured to produce syngas and black water from at least a fuel source, water, and oxygen, and a black water treatment system coupled to the gasification and scrubbing system. The black water treatment system is configured to treat the black water to produce a grey water. The system also includes a grey water treatment system coupled to the black water treatment system and configured to receive the grey water. The grey water treatment system includes a reactor configured to utilize oxygen to oxidize chemical species within the grey water to generate a treated grey water. The oxygen utilized by the gasification and scrubbing system and the reactor is generated by an air separation unit (ASU) fluidly coupled to the gasification and scrubbing system and the reactor.

In a second embodiment, a system includes a flow path that couples a gasification and scrubbing system and a grey water treatment system. The flow path is configured to flow a grey water generated from a blowdown of the gasification and scrubbing system to the grey water treatment system. The system also includes an air separation unit (ASU) that couples to the gasification and scrubbing system and to the grey water treatment system. The ASU is configured to generate a first stream of separated oxygen utilized by the gasification and scrubbing system to produce a syngas and a second stream of separated oxygen utilized by the grey water treatment system to treat the grey water.

In a third embodiment, a method includes gasifying a fuel source using a first oxygen stream supplied from an air separation unit (ASU), discharging a gasifier blowdown from a gasification and scrubbing system configured to gasify the fuel source, generating a grey water from the gasifier blowdown, and biologically treating the grey water in a reactor using a second oxygen stream supplied by the ASU.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a schematic block diagram of an embodiment of the gasification grey water treatment system of FIG. 2, wherein the biological treatment system includes an uncovered biological reactor;

DETAILED DESCRIPTION OF THE INVENTION

Figure 1:
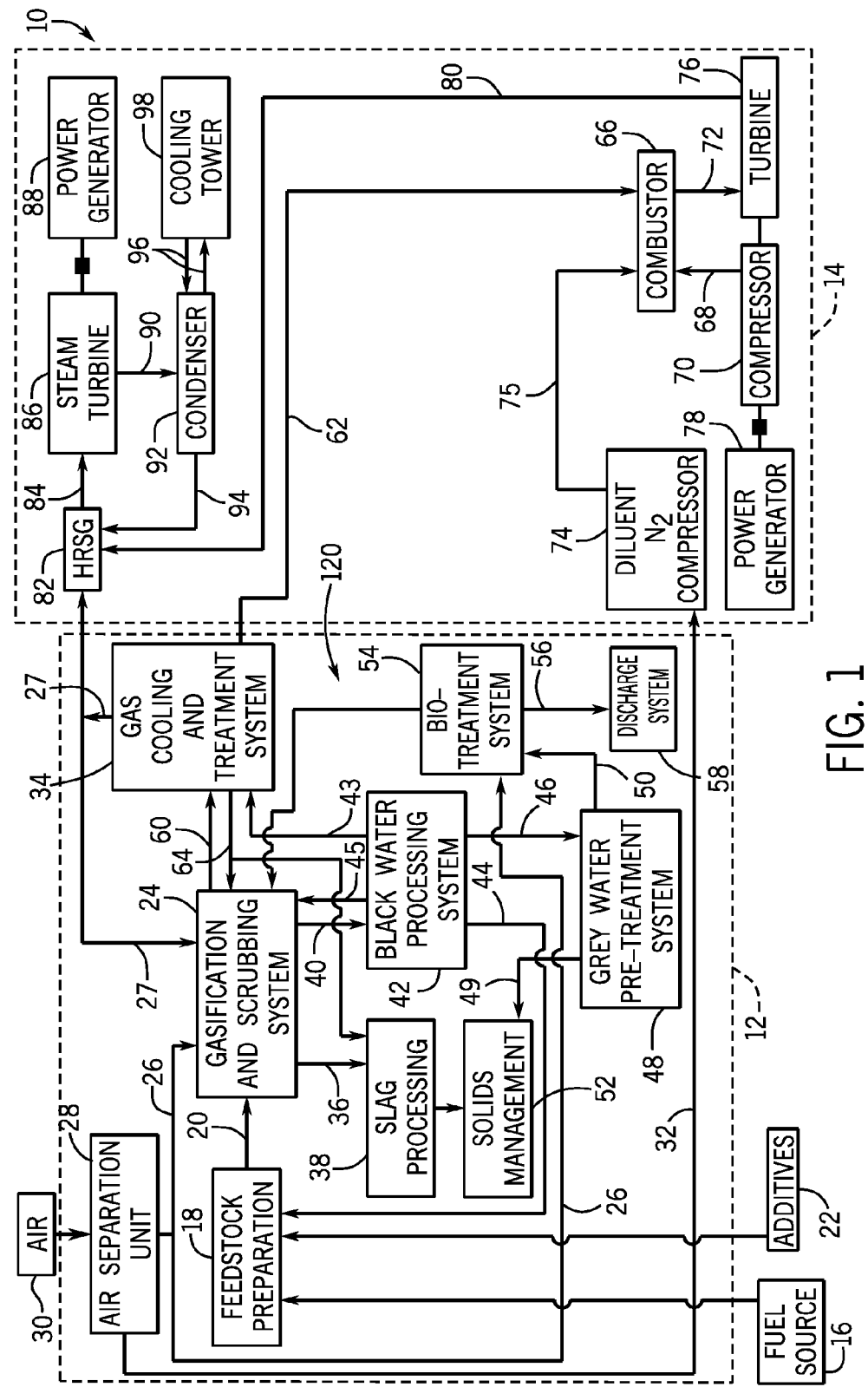
FIG. 1 is a schematic block diagram of an embodiment of an integrated gasification combined cycle (IGCC) system having a gasifier and a gasification grey water treatment system for treating grey water produced at the gasifier, and the grey water treatment system is integrated with an air separation unit configured to supply oxygen to the gasifier.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments provide systems and methods for grey water treatment that may be employed in gasification systems or integrated gasification combined cycle (IGCC) systems to treat grey water produced during gasification, scrubbing, and/or other syngas generation/treatment processes. The grey water treatment systems include biotreatment systems that utilize living microorganisms (e.g., single or multicellular microorganisms or "microbes" such as bacteria and protozoa). The microbes may be present as an activated sludge, suspended growth media, or supported media and may be selected and/or specially designed to remove target components (e.g., by-product chemical species from gasification) from the grey water. The microbes may remove the target components via catabolic processes (e.g., ingestion and respiration), which at least partially rely on the use of oxygen. Further, the microbes may convert some of the target components into other chemical components that may be released as a gas. Certain of these processes performed by the activated sludge use oxygen, thereby creating a biological oxygen demand (BOD). The BOD of the activated sludge is at least partially dependent upon the level of certain constituents within the grey water that are acted upon by the microbes. The level of certain constituents, and in particular organic constituents, may be considered to have an inherent chemical oxygen demand (COD), which corresponds to the amount of oxygen needed to oxidize the organic constituents in a particular sample. Accordingly, a sample acted upon by biological media (or another oxidizing agent) has a particular COD, while the biological media has a BOD.

In accordance with present embodiments, the BOD, the COD, or a combination thereof, may be met, at least partially, by integrating the biological treatment system(s), or other wastewater treatment systems, with an air separation unit (ASU) of a gasification plant. More specifically, the water treatment system(s) may be integrated with an ASU of a gasification facility, where the ASU supplies a stream of separated oxygen to a gasifier. The oxygen supplied to the water treatment system(s) may be a slip stream off of the oxygen stream supplied to the gasifier, or may be a dedicated stream. That is, the ASU may provide oxygen to a gasifier in a first oxygen flow path as a first oxygen stream, and may provide oxygen to a water treatment system in a second oxygen flow path as a second oxygen stream. The first and second flow paths may be divergent flow paths off of a common path, or may be entirely separate.

The mass flow of oxygen from the ASU to the water treatment system(s) may be controlled so as to meet the COD of grey water generated from the gasifier, the BOD of activated sludge used to treat the grey water (e.g., in a biological treatment system), or any combination thereof. For example, the oxygen from the ASU may act as a supplement to the intake of oxygen in ambient air by the biological treatment system, or may act as the main source of oxygen. Any and all permutations of the use of ASU oxygen from a gasification facility by water treatment system(s) are presently contemplated.

The gasification grey water treatment system also may include pretreatment equipment, such as heat exchangers, chemical reactors, clarifiers, filters, and a stripper, that reduce the presence of ammonia, scaling components and trace metals upstream of the biotreatment systems. Moreover, a discharge system having post-treatment equipment, such as clarifiers or membranes, dewatering equipment, filters, strippers, or aerobic digesters, or any combination thereof, may be included to remove additional components from the grey water. Additionally or alternatively, any one or a combination of these components may be utilized to enable continued biological treatment during gasification system or ASU outages. In addition, the water treatment systems also may include a controller to adjust parameters of the biotreatment systems (e.g., oxygen influx from the ASU) based on feedback of monitored parameters (e.g., BOD) throughout the water treatment systems.

While the present embodiments are applicable to a number of contexts in which an ASU may supply oxygen to a gasifier, FIG. 1 illustrates an embodiment of an IGCC system 10 in which the present embodiments may be employed. The IGCC system 10 includes a gasification system 12 integrated with a power generation system 14. In a general sense, the gasification system 12 produces a fuel that is utilized within the power generation system 14 to produce energy. Within the gasification system 12, a carbonaceous fuel source 16 may be utilized as a carbonaceous source to produce syngas. The fuel source 16 may include coal, petroleum coke, biomass, wood-based materials, agricultural wastes, tars, coke oven gas and asphalt, or other carbon containing materials.

The fuel source 16 may be introduced into the gasification system 12 via a feedstock preparation system 18. The feedstock preparation system 18 may resize or reshape the fuel source 16 to eventually generate a fuel slurry 20. In certain embodiments, discussed in detail below, the feedstock preparation system 18 may receive an influx of recycle biomass for use as at least a portion of the fuel source. Additives 22 may also be utilized to generate the fuel slurry 20. The additives 22 may include water or another suitable liquid (e.g., a surfactant or dispersant) capable of suspending the solid fuel. In other embodiments, such as where no liquid additives are employed, the fuel slurry 20 may be a dry feedstock.

The fuel slurry 20 may be directed from the feedstock preparation system 18 to a gasification and scrubbing system 24. The gasification and scrubbing system 24 may include a gasifier where the fuel slurry 20 may be mixed with oxygen 26 and steam 27 to produce syngas. The oxygen 26 is at least partially provided by an air separation unit (ASU) 28 that primarily separates air 30 into oxygen 26 and nitrogen 32. The steam 27 may be recycled within the IGCC system 10 and may be provided from a downstream gas cooling and treatment system 34. Additionally or alternatively, the steam 27 may be produced within the power generation system 14.

Within the gasification and scrubbing system 24, the gasifier may react the fuel slurry 20 with a limited amount of oxygen 26 at elevated pressures (e.g. from absolute pressures of approximately 20 bar to 85 bar) and temperatures (e.g., approximately 700° C. to 1600° C.) to partially oxidize (e.g., partially combust) the fuel slurry 20 and produce syngas. The majority of the syngas may include carbon monoxide and hydrogen, while other components such as methane, carbon dioxide, water, hydrogen chloride, hydrogen fluoride, carbonyl sulfide, ammonia, hydrogen cyanide, and hydrogen sulfide may also be present. Non-gasifiable ash material and unconverted and/or incompletely converted fuel slurry 20 may be byproducts of the process that may exist as larger particles of molten slag and smaller particles, referred to as fines.

The gasification and scrubbing system 24 also may include a cooler, such as a radiant syngas cooler or a quench unit. Within the cooler, the syngas may be cooled and saturated, causing certain components to solidify. In particular, the molten slag may be rapidly cooled and solidified into coarse particles of slag 36 that may be discharged from the gasification and scrubbing system 24 and provided to a slag processing system 38. The slag processing system 38 may include equipment such as a lock hopper, a drag conveyor, and/or a slag sump, among others. Within the slag processing system 38, the slag 36 may be screened to reduce moisture and then directed to disposal offsite, further processing, or recycling. For example, the slag 36 may be used as road base or as a repurposed building material.

In addition to producing slag 36, the gasification and scrubbing system 24 also may produce black water 40 that includes particles of slag, metals, salts, and other gasification byproducts. The black water 40 may be removed from the syngas within the quench unit and/or within a scrubber of the gasification and scrubbing system 24. In particular, within the scrubber, additional fines and other entrained gases, such as hydrogen chloride, may be removed. The black water 40 may be discharged from the gasification and scrubbing system 24 and directed to a black water processing system 42.

The black water processing system 42 may include equipment such as flash drums, settling tanks, and condensers, among others, that function to separate dissolved gases and concentrate the fine particles. For example, the black water processing system 42 may include a series of flash drums that subject the black water 40 to a series of pressure reductions that may cause the black water 40 to be partially evaporated and cooled to remove dissolved gases 43 from the black water 40. According to certain embodiments, the dissolved gases 43 may include syngas, which may be recovered in the gas cooling and treatment system 34. The black water processing system 42 also may include a settling process, where at least a portion of the slag particles are separated from the liquid portion of the black water 40. The settling process and, in certain embodiments, additional filtering, produces separated fines 44 and grey water 45. Thus, compared to the black water 40, the grey water 45 generally includes a reduced amount of particulate matter. However, the grey water 45 may still include suspended fines, organic materials, and trace metals. Thus, the black water processing system 42 also may produce a grey water blowdown 46, which is blown down to a grey water pretreatment system 48 for further treatment. The separated fines 44 may be recycled to the feed stock preparation system 14, where the fines may be used to provide additional fuel.

In the grey water pretreatment system 48, the grey water blowdown 46 may undergo further processing to remove or reduce the presence of certain compounds, such as ammonia and grey water solids 49, to produce a pretreated grey water 50. As described further below with respect to FIG. 2, the grey water pretreatment system 48 may include equipment (e.g., chemical reactors, clarifiers, filters, and strippers) that soften, clarify, and purify the grey water blowdown 46. The grey water pretreatment system 48 also may include one or more direct and/or indirect heat exchangers to cool the grey water blowdown 46. The grey water solids 49 removed from the grey water blowdown 46 may be conveyed to a solids management system 52, which processes the grey water solids 49 for disposal and/or re-use. Further, the solids management system 52 may receive a portion of the slag 36 from the slag processing system 38 for additional processing steps prior to discarding the slag 36.

The grey water pretreatment system 48 may be followed by a biotreatment system 54, which may include covered, uncovered, and/or agitated biological reactors that remove organic materials, metals, and gases from the pretreated grey water 50. According to certain embodiments, the biotreatment system 54 may include features (e.g., reactors, reaction media) that perform biological ingestion and respiration, and which utilizes specially developed and/or selected mixtures of naturally occurring microbes to remove target components from the pretreated grey water 50 to produce the treated discharge 56. The biotreatment system 54 may also include one or more anoxic selector zones for improved process performance and/or to control filamentous organisms detrimental to the removal of carbonaceous BOD. The treated discharge 56 may be sent to a discharge system 58, used for deep well injection, combined with another stream for offsite discharge, or discharged to a body of water if the treated discharge 56 meets certain requirements.

In addition to producing slag 36 and black water 40, the gasification and scrubbing system 24 also produces scrubbed syngas 60. The scrubbed syngas 60 may be directed to the gas cooling and treatment system 34 where the scrubbed syngas 60 may be further treated to produce treated syngas 62. The gas cooling and treatment system 34 also may produce a syngas condensate 64 that may be employed in the gasification and scrubbing system 24 and/or the slag processing system 38. According to certain embodiments, the gas cooling and treatment system 34 may include one or more shift reactors that adjust the ratio of hydrogen to carbon monoxide in the scrubbed syngas 60. The gas cooling and treatment system 34 also may include one or more acid gas removal (AGR) systems that may remove acid gases, such as hydrogen sulfide and carbon dioxide, among others. Further, the gas cooling and treatment system 34 may include one or more stripping processes for removing ammonia. Moreover, a tail gas treatment process also may be included to convert most of the residual sulfur compounds from upstream processing, such as from a sulfur recovery unit, to hydrogen sulfide.

The treated syngas 62 may be used to generate power within the power generation system 14. In particular, the treated syngas 62 may be directed to a combustor 66, where the treated syngas 62 may be combusted at a much higher efficiency than the original carbonaceous fuel 16 fed into the feedstock preparation system 18. Air 68 (or another oxidant) also may be provided to the combustor 66 from a compressor 70 to mix with the treated syngas 62 in a fuel to air ratio that facilitates combustion of the treated syngas 62 to produce combustion gases 72.

In addition to the air 68, nitrogen may also be utilized within the combustor 66 to control combustion temperatures. In the illustrated embodiment, for example, a diluent nitrogen compressor 74 may compress the separated nitrogen 32 generated by the ASU 28 into a compressed nitrogen stream 75. The diluent nitrogen compressor 74 may provide the compressed nitrogen stream 75 to the combustor 66 in a controlled manner as a diluent gas, which enables control of combustion temperatures (e.g., to control the composition of the combustion gases 72).

The combustion gases 72 from the combustor 66 may be directed to a turbine 76, which may drive the compressor 68 and/or an electrical generator 78 (or another load). Exhaust 80 from the turbine 76 may then be fed to a heat recovery steam generation (HRSG) system 82, which may recover heat from the exhaust 80. The recovered heat may be used to generate steam 84 for driving a steam turbine 86, which in turn may drive a generator 88 to generate additional electricity.

Discharge steam 90 from the steam turbine 86 may be directed through a condenser 92 where the steam 90 may be condensed to provide condensed steam 94. To condense the steam 90, a cooling fluid 96, such as water, may be circulated through the condenser 92 from a cooling tower 98. The condensed steam 94 from the condenser 92 may then be recycled to the HRSG system 82 where the condensed steam 94 may again be heated to generate the steam 84 for the steam turbine 86.

As may be appreciated, the components of the IGCC system 10 are a simplified depiction and are not intended to be limiting. For example, in certain embodiments, additional equipment such as valves, temperature sensors, pressure sensors, controllers, and/or storage tanks, among others, may be included. Further, although the grey water treatment system 48 is described herein in the context of an IGCC system 10, the grey water pretreatment system 48 and the biotreatment system 54 may be employed in other types of gasification systems. For example, the grey water pretreatment system 48 and the biotreatment system 54 may be part of a separate gasification system 12 that may provide treated syngas 62 to a chemical plant for chemical production. Alternatively or additionally, similar or the same features in the grey water pretreatment system 48 and the biotreatment system 54 may be utilized in other contexts, such as substitute natural gas (SNG) generation systems, fracturing water treatment systems, deep well injection systems (e.g., to treat injectates), municipal waste water treatment systems, and the like. In other words, the biotreatment system 54, or another water treatment configuration utilizing the ASU oxygen 26, may be used in the treatment of SNG generation system effluents, fracturing water, deep well injectates, municipal wastewater, or any combination thereof.

Figure 2:
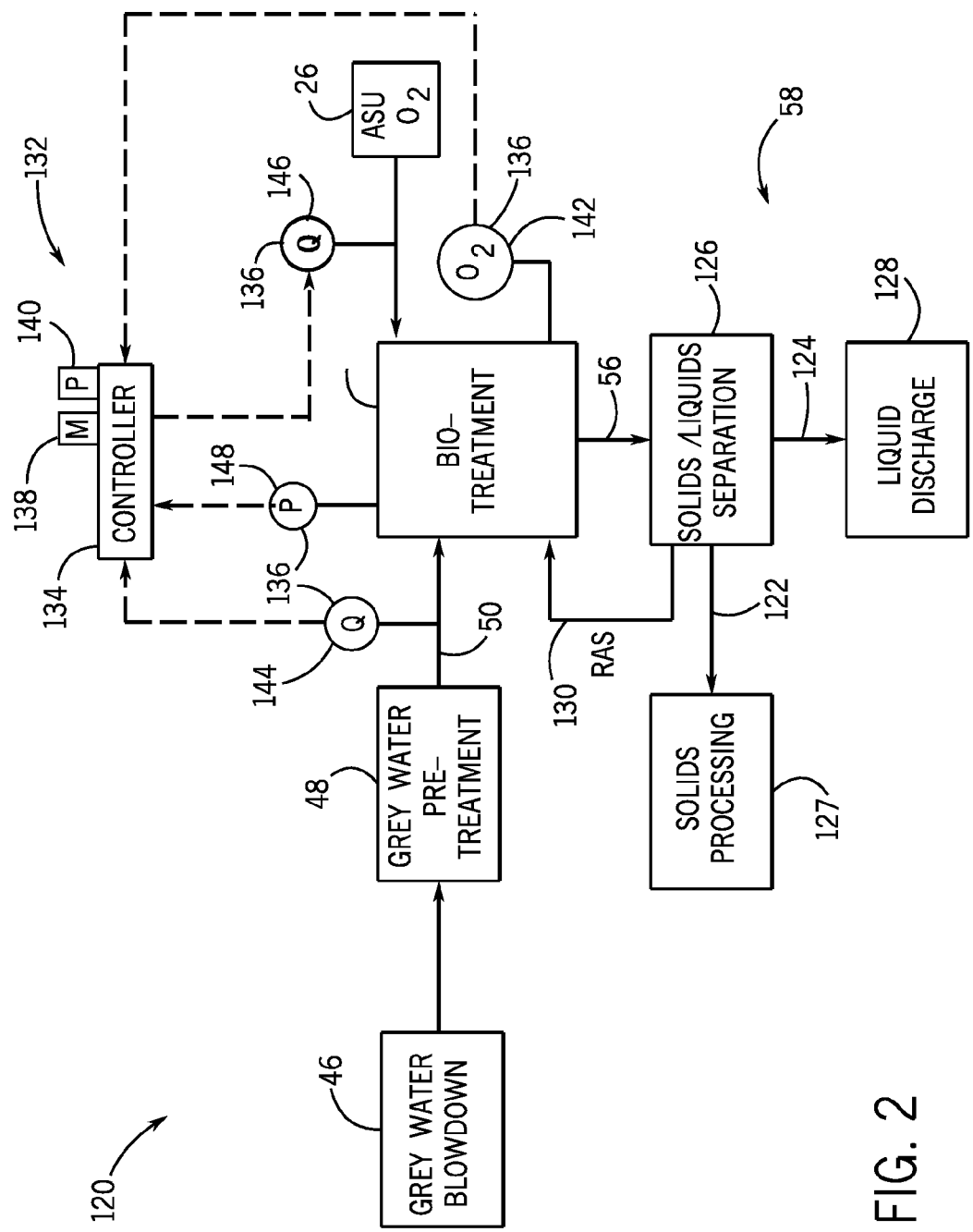
FIG. 2 is a schematic block diagram of an embodiment of the gasification grey water treatment system of FIG. 1 having a biological treatment system.

In some embodiments, the black water processing system 42, the grey water pretreatment system 48, the biotreatment system 54, or any combination thereof, may form all or a part of a water treatment system 120, one embodiment of which is illustrated schematically as a block diagram in FIG. 2. In the embodiment illustrated in FIG. 2, the water treatment system 120 receives the grey water blowdown 46 and outputs streams of removed solids 122 and liquid effluent 124 (e.g., treated water). In general, to process the grey water blowdown 46, the water treatment system 120 may include the grey water pretreatment system 48 followed by the biotreatment system 54. Again, though not illustrated, the water treatment system 120 may include other features, such as the black water processing system 42.

As depicted, the grey water pretreatment system 48 receives the grey water blowdown 46. The grey water pretreatment system 48 may include a filter, a clarifier, a stripper (e.g., for ammonia), one or more oxidation reactors (e.g., reactors in which one or more chemical oxidants are utilized), one or more hardness-reducing reactors (e.g., reactors in which precipitating reactants are utilized), or a heat exchanger, or any combination thereof, to enable treatment of the grey water blowdown 46 in a manner that facilitates biotreatment. The pretreated grey water 50 that exits the grey water pretreatment system 48 then passes to the biotreatment system 54.

In certain embodiments, the water treatment system 120 may include reactors that are substantially free of biological media, such as one or more oxidation reactors configured to utilize the ASU oxygen 26 to directly oxidize organic, nitrogenous, metallic, or other materials in the grey water blowdown 46 and/or the pretreated grey water 50. For example, in one embodiment, a reactor may include one or more oxygen delivery units such as jet aerators, diffusers (e.g., coarse and/or fine bubble diffusers), gas inlets, or any combination of such features, to deliver oxygen into a reaction zone of the reactors so as to enable mixing of the oxygen and the grey water blowdown 46 and/or the pretreated grey water 50 to facilitate oxidation. Such reactors that are substantially free of biological media may be used in addition to, or in lieu of, the biotreatment system 54, or may be a component of the biotreatment system 54.

Again, the biotreatment system 54 may use naturally occurring and/or specially designed microbes to further treat the pretreated grey water 50. The biological media may be present as an activated sludge, as a suspended growth system in which a mixed liquor (e.g., a mixture of a water to be treated and the microbes) is generated and/or may be present as biomass residing on an attachment medium such as one or more membranes, filters, beds, plastic shapes, or another porous medium. For example, the biotreatment system 54 may include a plurality of bioreactor cells having microbes residing on a support material such as granular carbon, a plastic support, or the like.

Generally, target components in the pretreated grey water 50 may be ingested by the microbes to be utilized as an energy source during the catabolic processes of the microbes. Thus, the processes described herein may generally be performed in one or more aeration vessels, in which the microbes (e.g., bacteria) ingest organic materials, intake oxygen, and biologically oxidize the organics using the oxygen. As set forth above, such catabolic processes (e.g., ingestion and respiration) will generally create a biological oxygen demand (BOD). In accordance with present embodiments, oxygen may be supplied to the biotreatment system 54 via the ASU 28 of the gasification system 10 (FIG. 1) to meet the BOD (e.g., the ASU oxygen 26 may partially or completely meet the BOD). In certain embodiments, one or more additional air sources (e.g., a blower, a compressor, an ambient air intake) may also provide a source of oxygen.

In certain embodiments, one or more storage tanks may be provided (e.g., as a part of the water treatment system 120) for the storage of the ASU oxygen 26, ambient air, or a combination thereof. For example, the one or more storage tanks may enable the storage of the ASU oxygen 26 for use during downtime of the ASU 28 (e.g., during maintenance periods). Thus, the one or more storage tanks may provide a feed of the ASU oxygen 26 to the biotreatment system 54 (or another water treatment system utilizing the ASU oxygen 26), even when the ASU 28 is down. Additionally or alternatively, the one or more storage tanks may be utilized to generate a gaseous feed for the biotreatment system 54 having a desired oxygen content. For example, a controller (discussed in detail below) may adjust a flow of the ASU oxygen 28, ambient air, and/or other gaseous feeds into the one or more storage tanks in certain amounts. The amounts of the ASU oxygen 28, the ambient air, and other feeds, may be selected such that the gaseous feed for the biotreatment system 54 has a desired oxygen content, pressure, temperature, or other suitably adjusted parameter. The one or more storage tanks may also enable provision of the ASU oxygen 26 to the biotreatment system 54 when the ASU 28 is unable to directly meet the oxygen demand of the biotreatment system 54 (e.g., during peak gasification periods where a maximum amount of ASU oxygen 28 is provided to the gasification and scrubbing system 24).

Integration of the ASU 28 and the biotreatment system 54 in the manner described herein enables the cost and process-efficient provision of at least a portion of the oxygen 26 from the ASU 28 to the biotreatment system 54, particularly during peak loads of grey water blowdown 46. For example, peak loads may include a high volume of the grey water blowdown 46 being conveyed to the biotreatment system 54 and/or high concentrations of target components within the grey water blowdown 46. Such target components may include dissolved or undissolved organic materials, nitrogen, phosphates, and other gasification byproducts that are acted upon by the microbes. In some embodiments, air may be provided to the aeration vessels to support the BOD during normal periods (e.g., non-peak periods). However, in embodiments where the BOD/COD peaks, the ASU oxygen 26 may be utilized to trim the demand down to normal levels that are supportable by the ambient air influx. In other embodiments, the ASU oxygen 26 may be supplied normally to the aeration vessels, and air may be utilized to trim peak loads in this manner. Indeed, any and all permutations of the use of the ASU oxygen 26 to either meet normal oxygen demand, trim peak oxygen demand, or support either, are presently contemplated.

As discussed in further detail below, the biotreatment system 54 may include one or more reactors (e.g., aeration vessels, membrane housings, suspended growth systems) each having the same or different configurations in which the pretreated grey water 50 may be subjected to microbes. Thus, the one or more reactors may be sized for the carbonaceous BOD demand of gasification wastewater or blowdown. For example, the biotreatment system 54 may include one or more biological reactors disposed in serial, in parallel, or any combination of such arrangements (e.g., two or more in series with two or more in parallel). In addition, the biological reactors may be arranged in a manner that facilitates the treatment of certain chemical species. For example, pH levels (e.g., of the mixed liquor of activated sludge and grey water) may decrease when using purified oxygen (e.g., the ASU oxygen 26), which can hinder certain biotreatment processes such as nitrification (e.g., oxidation of nitrogenous species). Accordingly, it may be desirable to maintain pH levels above or below certain target pH levels, depending on the particular context in which the biotreatment system 54 is utilized.

As an example, arranging aeration basins (or other such reactors) in serial to first utilize the ASU oxygen 26 in one or more first aeration basins, followed by one or more second aeration basins that utilize ambient air as an oxygen source, or vice-versa, may facilitate such pH maintenance. Indeed, such a configuration may offer greater operational flexibility when compared to other approaches, such as using longer sludge age, greater aeration tank volume, and increased settling basin area. Thus, in one embodiment, the biotreatment system 54 may utilize one or more first reactors that utilize a first oxygen source (e.g., the ASU oxygen 26), and one or more second reactors that utilize a second oxygen source (e.g., ambient air). The one or more first reactors and the one or more second reactors may be arranged in serial, in parallel, or any combination thereof.

After undergoing treatment within the biotreatment system 54, the pretreated grey water 50 may exit as the treated discharge 56. The treated discharge 56 may be conveyed to the discharge system 58, which may include a solids/liquids separation system 126. The solids/liquids separation system 126 may separate the treated discharge 56 into different streams. For example, the removed solids 122 (e.g., remnants of target components) may be separated from the rest of the treated discharge 56 and sent to a solids processing system 127, which may convey the removed solids 122 to the gasifier as a recycled fuel source, to an offsite disposal site, or elsewhere. The effluent 124 may be discharged to a liquid discharge system 128. The liquid discharge system 128 may include reuse of the effluent 124 within the IGCC system 10, such as for cooling water, discharge to a nearby body of water, storage within a tank, or another system. Further, as one example, any activated sludge that may accompany the treated discharge 56 into the solids/liquids separation system 126 may be separated and directed back into the biotreatment system 54 as return activated sludge (RAS) 130. The solids/liquids separation system 126 may include a clarifier, a filter press, an atmospheric evaporator, membrane filtration units, or other equipment to separate liquid and solid streams, or any combination thereof.

The water treatment system 120 may, in addition to any combination of the components described above, employ a control system 132 to regulate the operation of any one or more a combination of the components. The control system 132 may include a controller 134 to adjust operating conditions of the water treatment system 120, particularly with respect to the biotreatment system 54. In addition, the controller 134 may monitor and control various flows to and from the solids/liquids separation system 126. To enable monitoring, the control system 132 may include sensors 136 to provide feedback indicative of one or more monitored operational parameters of the water treatment system 120 to the controller 134. Particularly, the controller 134 may use data from the sensors 136 as an input for one or more control algorithms (e.g., instructions) stored on a non-transitory, machine-readable medium (e.g., memory 138), and which are executable on one or more processors 140. The one or more parameters monitored by the controller 134 may include a temperature of the pretreated grey water 50, a concentration of the chemical species in the pretreated grey water 50, a reactivity of the chemical species in the pretreated grey water 50, a solubility of the oxygen in the pretreated grey water 50, a biological oxygen demand, a chemical oxygen demand, or any combination thereof. Indeed, as a result of this monitoring, the controller 134 may adjust the amount of ASU oxygen 26 supplied to the biotreatment system 54, an amount of air supplied to the biotreatment system 54, or the flow of the pretreated grey water 50 to the biotreatment system 54, or any combination thereof.

By way of non-limiting example, the control system 132 may utilize an oxygen sensor 142 (e.g., one or more dissolved oxygen probes) positioned within the biotreatment system 54 to monitor oxygen levels within various treatment units. Such sensors 142 may enable the controller 134 to determine whether the monitored oxygen levels are adequate to support the activated sludge under the present COD and/or BOD loads. Indeed, the one or more oxygen sensors 142 may enable the determination of the COD of the pretreated grey water 50 and/or the grey water blowdown 46, and/or the BOD.

One or more flow rate sensors 144 and one or more flow controllers 146 may be in communication with the controller 134 to monitor and control, respectively, various flows to, from, and within the biotreatment system 54. For example, one or more flow rate sensors 144 may provide feedback indicative of an amount of pretreated grey water 50 entering the biotreatment system 54. With this information, the controller 134, operators, or both, may determine and/or estimate the oxygen demand of the microbes and make adjustments accordingly. For example, the one or more flow controllers 146 (e.g., one or more flow control valves, variable speed pumps, compressors, blowers, guide vanes, or any combination thereof) may be actuated by the controller 134 to adjust the flow of the ASU oxygen 26 into the biotreatment system 54. For example, in embodiments where an oxygen level (as provided by one or more of the oxygen sensors 142) in the biotreatment system 54 falls below a threshold value, instructions within the memory 138 of the controller 134, when executed, may generate one or more control signals that cause the flow controller 146 to increase the flow of the ASU oxygen 26 from the ASU 28 into the biotreatment system 54. Conversely, if the oxygen sensor 142 indicates the oxygen level is adequate, the flow controller 146 may decrease or entirely discontinue the flow of the ASU oxygen 26 to the biotreatment system 54.

One or more pressure sensors 148 may provide information about the reactions occurring within the biotreatment system 54. For example, the pressure sensors 148 may provide feedback indicative of rising pressure—an indication that gases are evolving from reactions. In one such embodiment, the controller 134 may generate one or more control signals for the biotreatment system 54 to be vented. Additionally or alternatively, the controller 134 may generate a user-perceivable indication (e.g., a tactile, auditory, and/or visual indication) that one or more vessels in the biotreatment system 54 are being or should be vented. Other sensors 136 also may be incorporated into the control system 132. For example, temperature, pH, flow control, and/or speed control sensors and actuators may improve the operability of the water treatment system 120.

In a general sense, the controller 134 may utilize the COD and/or the BOD to control the flow of the ASU oxygen 26 (and the flow of ambient air) and/or the pretreated grey water 50 into and/or through the biotreatment system 54. In certain embodiments, the COD of the grey water blowdown 46, if monitored upstream of the biotreatment system 54, may enable a pre-emptive response in providing the ASU oxygen 26 to the biotreatment system 54 to meet the BOD of the microbes of the biotreatment system 54. For example, while the dissolved materials that can be oxidized (e.g., organic matter) may be referred to as the COD of the grey water blowdown 46, the BOD, as set forth above, is a measure of the oxygen demand created by biodegradation of materials within the grey water blowdown 46 by the microbes (e.g., activated sludge). Thus, monitoring the BOD measures the action of the microbes on the grey water blowdown 46. Accordingly, monitoring the BOD of the microbes enables a feedback loop for the controller, which enables the controller 134 to make adjustments to the flow rate of the ASU oxygen 26 and/or the pretreated grey water 50 as the BOD changes. On the other hand, monitoring the COD of the grey water blowdown 46 may enable a feed forward control mechanism (e.g., a control mechanism in which the flow of the ASU oxygen 26 and/or the pretreated grey water 50 is adjusted prior to the action of the microbes on the grey water). Thus, the controller 134 may monitor the COD of the grey water blowdown 46, the BOD of the microbes, or a combination thereof, to control the flow rate of the ASU oxygen 26 to the biotreatment system 54.

Indeed, if the BOD of the microbes is not met, the microbes cannot completely digest the target components within the grey water blowdown 46, leaving the grey water blowdown 46 partially untreated. Accordingly, monitoring the COD of the grey water blowdown 46 and/or the pretreated grey water 50 may enable the controller 134 to adjust the flow of the ASU oxygen 26 and/or the pretreated grey water 50 to the biotreatment system 54 either before or as the microbes deplete BOD, which can reduce the occurrence of untreated portions of the grey water and stabilize the conditions within the aeration vessels.

Additionally or alternatively, the controller 134 may adjust the contact time between the microbes and the pretreated grey water 50 depending upon one or more monitored parameters of the grey water, the biological treatment system, or a combination thereof. For example, in embodiments where the biotreatment system 54 utilizes an activated sludge system, or a suspended growth system, the controller 134 may adjust a retention time of the pretreated grey water 50 within the activated sludge/suspended growth based on feedback indicative of one or more monitored parameters In embodiments where the biotreatment system 54 utilizes microbes residing on a porous medium, the controller 134 may adjust a flow rate of the pretreated grey water 50 therethrough. In further embodiments, such as when the solids/liquids separation system 126 includes one or more membrane filtration units, the controller 134 may, additionally or alternatively, adjust a flow of the treated discharge 56 through the membrane filtration units based on the feedback.

The monitored parameters may include a temperature of pretreated grey water 50, a concentration of the chemical species in the pretreated grey water 50, a reactivity of the chemical species in the pretreated grey water 50, a solubility of the oxygen in the pretreated grey water 50, a biological oxygen demand of the microbes, a chemical oxygen demand of the pretreated grey water 50, or any combination thereof. Adjustments to the various flows of the ASU oxygen 26, ambient air, and the pretreated grey water 50 may depend both upon these monitored parameters, and the particular type of biological treatment being utilized. Example embodiments of various configurations of the biological treatment system 54 are described in further detail below with respect to FIGS. 3-5.

Figure 3:
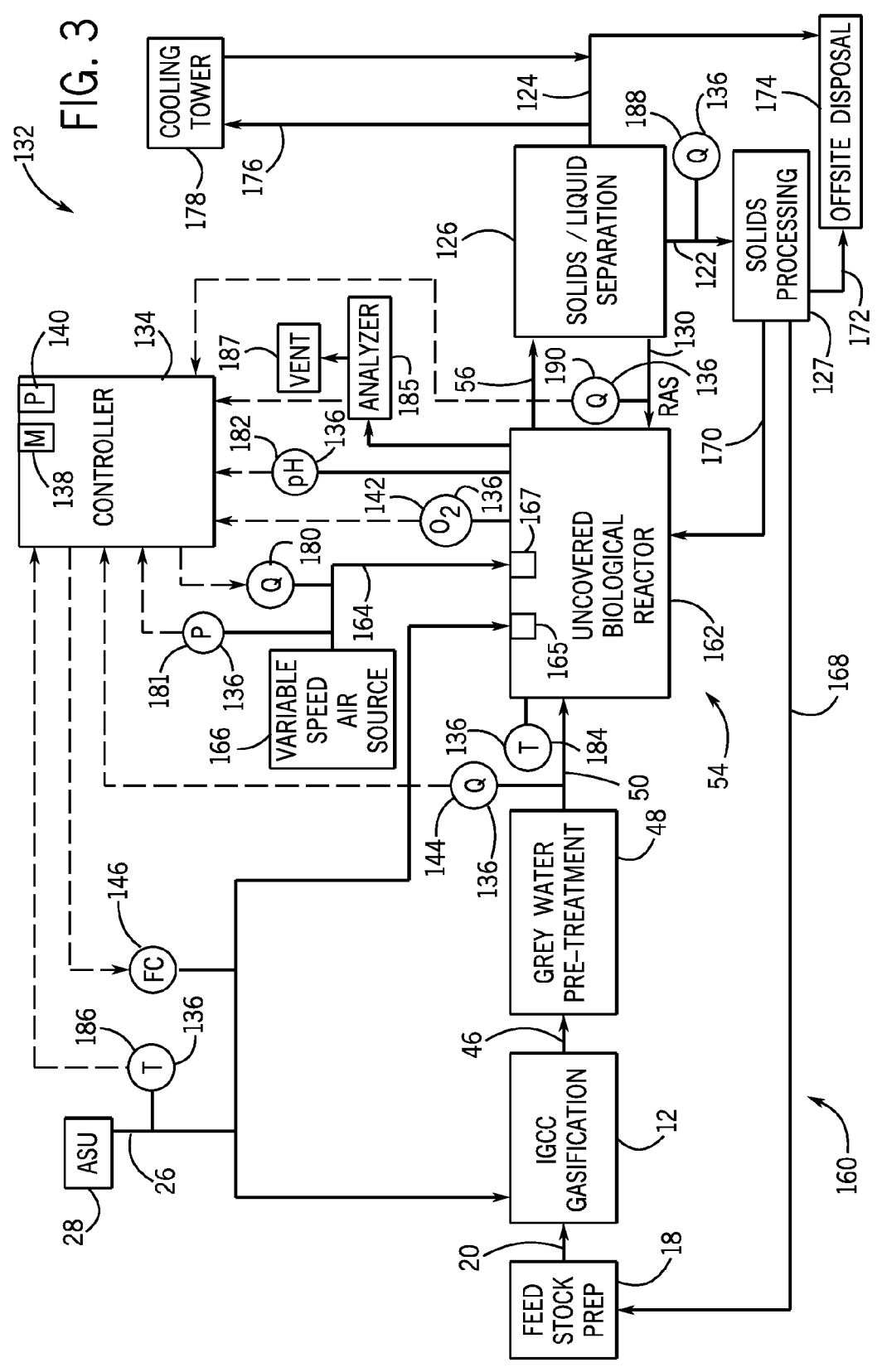

FIG. 3 is a schematic depiction of one embodiment of the water treatment system 120 in which the water treatment system 120 includes an uncovered biological reactor system 160. As discussed above, the gasification system 12 produces the grey water blowdown 46, which may contain certain target compounds. The grey water blowdown 46 is processed in the grey water pretreatment system 48 to remove large particulates and gases, such as ammonia. They grey water pretreatment system 48 may also include features that facilitate cooling of the grey water blowdown 46, such as heat exchangers, fans, expanders, or the like, to reduce the temperature of the grey water blowdown 46. Decreasing the temperature of the grey water blowdown 46 may be desirable to enhance precipitation and flocculation, and to enhance oxygen solubility. For example, the pretreated grey water 50 may exit the grey water pretreatment system 48 between approximately 20 and 50° C., 25 and 45° C., or 30 and 40° C. Further, the ability to adjust temperature of the pretreated grey water 50 to modify mixed liquor temperature and have sufficient dissolved oxygen from the ASU oxygen 26 enables flexibility in optimizing solids retention time (SRT), mixed liquor viscosity to enhance oxygen transfer, metabolic kinetics, and control of power requirements.

The pretreated grey water 50 may be conveyed to the biotreatment system 54, which, in the illustrated embodiment, includes at least one uncovered biological reactor 162. The uncovered biological reactor 162 also may receive air 164 from a variable speed air source 166, such as a blower or compressor. The variable speed air source 166 may have one or more speed and/or flow control features, including speed controls (e.g., motors), guide vanes, or other flow/speed adjusting features. In certain embodiments, the naturally occurring oxygen within the air 164 may supply an adequate oxygen level for the microbes contained within the uncovered biological reactor 162. However, as noted above, when the microbes are subjected to peak loads (e.g., COD/BOD), the uncovered biological reactor 162 may be supplemented with the ASU oxygen 26. In still further embodiments, the ASU oxygen 26 may meet the COD/BOD during normal loads, and may be adjusted during peak load periods and/or supplemented with air during such periods. As depicted, the one or more oxygen sensors 142, which may include dissolved oxygen probes, may be positioned on or within the uncovered biological reactor 162 so as to provide oxygen concentration feedback to the controller 134. In response to this feedback, the controller 134 may execute one or more instructions to adjust or maintain the flow of the ASU oxygen 26, the air 164, or a combination thereof, to the reactor 162.

The uncovered biological reactor 162 may be in the form of an open basin, such as an aeration basin, wherein the mixed liquor (e.g., the activated sludge and pretreated grey water 50 mixture) is left open to the surrounding environment. In other embodiments, the uncovered biological reactor 162 may be in the form of a rotating biological contactor, wherein the microbes are disposed on a rotating structure that intermittently contacts a pool of the pretreated grey water 50. The use of the uncovered biological reactor 162 may enable the pretreated grey water 50 to be exposed to the naturally supplied oxygen contained within the surrounding air, the ASU oxygen 26, or a combination thereof. The depth of the mixed liquor within the uncovered biological reactor 162 may be between approximately 1.5 and 15 m, 3 and 12.5 m, or 6 and 9.5 m. To enable mixing of the air 164 and/or the ASU oxygen 26 with the microbes and the pretreated grey water 50 (e.g., the mixed liquor), in certain embodiments, the reactor 162 may include one or more agitation features, such as an impeller, a screw conveyor, sonicators, various sparging equipment, bubble diffusers, jet mixers, Venturi mixers, or any combination of these and/or similar features. One example of such a configuration is discussed in further detail below with respect to FIG. 5.

Additionally or alternatively, the variable speed air source 166 may provide mixing energy to the uncovered biological reactor 162, such that a majority of the mixed liquor is contacted with air 164 and/or the ASU oxygen 26. Both the air 164 and the ASU oxygen 26 may be supplied continuously, cyclically, or intermittently, as determined by the microbial (e.g., activated sludge) concentration, concentration of target components in the pretreated grey water 50, desired retention time of the mixed liquor in the uncovered biological reactor 162, depth of the mixed liquor in the uncovered biological reactor 162, temperature of the incoming pretreated grey water 50, or additional process parameters.

The ASU oxygen 26, the air 164, or a combination thereof, may be provided to the uncovered biological reactor 162 via dedicated inlets 165 and 167, respectively. In other embodiments, the ASU oxygen 26 and the air 164 may share one or more of the inlets 165, 167. In addition, while depicted at a particular location, the inlets 165, 167 may be positioned at any suitable location on or in the uncovered biological reactor 162. For example, the inlets 165, 167 may be located at the top of the reactor 162, on the sides of the reactor 162 (e.g., mounted on a side wall of the reactor 162), at the bottom of the reactor 162 (e.g., mounted on a floor of the reactor 162), or any combination thereof. Indeed, the injection of the ASU oxygen 26 and/or the air 164 into the reactor 162 (e.g., into a reaction zone of the reactor 162) may provide a degree of mixing/agitation within the reactor 162 (e.g., via sparging). In embodiments where the reactor 162 includes one or more membranes or other porous media on which the biological media is supported, either or both of the inlets 165, 167 may be constructed as a part of the support.

The inlets 165, 167 may have any suitable configuration. By way of example, the inlets 165, 167 may include diffusers such as fine and/or coarse diffusers, or similar gas injection features. Further, the inlets 165, 167 may be constructed from a material suitable for withstanding the environment within the reactor 162. For example, the inlets 165, 167 may have some degree of corrosion resistance, resistance to clogging, and resistance to other undesirable processes caused by by-product formation. Example materials for the inlets 165, 167 may include polytetrafluoroethylene (PTFE)-based resins, stainless steel, DELRIN® acetal resin available from DuPont™, polyvinyl chloride (PVC), ethylene propylene diene monomer (EPDM) resins, PTFE backed with EDPM, polyurethane, VITON® fluoroelastomer available from DuPont™, chemical resistant polymers, or the like. In addition, the diffusers may be constructed from PTFE over thermally bonded polypropylene, PTFE over laminated fiberglass or a polyester non-woven material, expanded PTFE in a web-like structure over a rubber, plastic, fiberglass, or metal support tube or plate support structure. In some embodiments, the diffusers may include PTFE treated with materials that inhibit microbial adhesion. Further, perforated or non-perforated PTFE backed by a grid or suitable support material may be used for the inlets 165, 167, which enables pore closing if no ASU oxygen 26 is being used (e.g., when the ASU oxygen 26 is stopped or cut). Indeed, the incorporation of such diffusers may be desirable to enhance mixing while also providing a higher surface area for oxygen injection to facilitate treatment of the pretreated grey water 50.

In accordance with certain embodiments, the use of the ASU oxygen 26 in combination with the diffusers noted above may counteract limited oxygen solubility within the mixed liquor at elevated temperatures (e.g., between 90° F. and 105° F., between approximately 32.2° C. and 40.5° C.). That is, at such temperatures, low oxygen levels due to the use of ambient air or air mixtures as the oxygen source can be unsuitable for biological respiration and concomitant oxidation of the pretreated grey water 50 target components (e.g., organics). Indeed, the use of the ASU oxygen 26 as an oxygen source enables higher temperatures in the reactor 162. Thus, one or more heat exchangers disposed upstream of the reactor 162 (e.g., in the grey water pretreatment system 48) may adjust the temperature of the pretreated grey water 50 such that the temperature in the reactor 162 is below approximately 40.5° C., such as between approximately 0° C. and 40° C., 10° C. and 40° C., 20° C. and 40° C., 25° C. and 38° C., or 30° C. and 35° C.

Once the treated discharge 56 is generated from the pretreated grey water 50 in the uncovered biological reactor 162, the treated discharge 56 (e.g., and after any predetermined time period during or after treatment) is conveyed to the solids/liquids separation system 126. In some embodiments, the solids/liquids separation system 126 may include membranes capable of performing solid-liquid separation. In certain of these embodiments, the membranes may be utilized in addition to, or in place of, secondary clarifiers and tertiary filters. By way of example, the membranes may include one or more of a series of reinforced hollow fibers, tubular membranes, panels or sheets arranged or mounted in removable modules. Advantageously, the combination of the ASU oxygen 26 as a main air source with the use of membranes for solids separation and recycle enable the uncovered biological reactor 162 to have a reduced volume compared to embodiments where the membranes are not utilized, which reduces the overall footprint of the treatment system 160. The membrane material may include polyvinylidene fluoride (PVDF), polypropylene, or other hydrophobic materials. Depending upon the temperature in the biological reactor 162, mixed liquor suspended solids concentrations in the biological reactor 162, the dissolved oxygen concentration level in the biological reactor 162, potential scaling compounds originally derived from the gasification fuel source in the biological reactor 162, membrane materials of construction, and peak hourly flow conditions, hydraulic flux rates through the one or more membranes may vary from 5 to 50 gallon per square foot per day (approximately 204 to 2004 liters per square meter).

The membrane filters, clarifiers, tertiary filters, or any combination of such features, of the solids/liquids separation system 126 may separate the treated discharge 56 into the removed solids 122, the effluent (e.g., treated water) 124, and the RAS 130. The removed solids 122 may be directed to the solids processing system 127, which may include further digestion (e.g., respiration by the biological mass), thickening, and/or dewatering processes. After suitable processing, the removed solids 122 may be separated into recycled solids 168 that may be sent back as a recycle feed to the feedstock preparation system 18, filtrate 170 that may be sent back to the uncovered biological reactor 162 (e.g., for further biodegradation), or disposal solids 172 that may be directed to an offsite disposal repository 174. The effluent 124 that leaves the solids/liquids separation system 126 may be utilized within the gasification system 12 as makeup coolant 176 and may be directed to a cooling tower 178. Additionally or alternatively, the effluent 124 may be directed to the offsite disposal repository 174. The RAS 130, which may include biological material, may be conveyed back into the uncovered biological reactor 162 to continue treating the pretreated grey water 50. Indeed, the recycle of materials in the manner described above may enable the reduction or total elimination of solids waste from gasification processes.

In the depicted embodiment, the control system 132 of the uncovered biological reactor system 160 includes the plurality of sensors 136 that communicate and interact with the memory 138 and processor 140 of the controller 134 to monitor and adjust the operation of the system 160. Particularly, the sensors 136 may monitor parameters of the system 160 that may affect the efficiency of the catabolic processes of the microbes within the uncovered biological reactor 162. As discussed above, the one or more oxygen sensors 142 (e.g., dissolved oxygen probes) may monitor the oxygen level within the uncovered biological reactor 162 to ensure that the oxygen level is adequate to support the microbes under the current COD and/or BOD loads. Further, the flow rate sensor 144 and the flow controller 146 may be in communication with the controller 134 to monitor and adjust the oxygen level within the biotreatment system 54. For example, based on the flow rate of the pretreated grey water 50, and the associated target components, the controller 134 may initiate, increase, maintain, decrease, or discontinue the flow of the ASU oxygen 26 into the uncovered biological reactor 162 via the flow controller 146.

Similarly, a flow controller 180 (e.g., guide vanes, a blower, variable speed pump, flow control valve, or any combination thereof) may adjust the amount of air 164 directed from the variable speed air source 166 to the uncovered biological reactor 162. Such adjustments may be based on the flow rate of the pretreated grey water 50 (via sensor 144) and/or the oxygen content within the uncovered biological reactor 162 (via sensor 142). The pressure of the air 164 also may be monitored via a pressure sensor 181. The pressure sensor 181 may be used to determine the amount of mixing energy that is supplied to the mixed liquor within the uncovered biological reactor 162 (e.g., via diffusers of the inlets 165, 167), thus ensuring that the mixed liquor is well-mixed and thoroughly exposed to the air 164. One or more pressure sensors may similarly monitor the flow of the ASU oxygen 26 to the reactor 162.

Additional sensors 136 may monitor physical and chemical conditions within the uncovered biological reactor 162. For example, a pH sensor 182 may provide an indication of the environment within the uncovered biological reactor 162. Such information can be important for maintaining desirable conditions within the reactor 162, as the biological material within the reactor 162 may not be able to tolerate extremely acidic or alkaline environments. In certain embodiments, alkaline or acidic environments may also hinder the action of the biological materials on certain target compounds, including nitrogenous species.

A temperature sensor 184 of (e.g., within) the uncovered biological reactor 162 may supply temperature data to the controller 134. Monitoring the temperature within the reactor 162 may be desirable to ensure that desired amounts of oxygen can be dissolved within the reactor 162. Again, as noted above, utilization of the ASU oxygen 26 as at least a portion of the oxygen source utilized within the uncovered biological reactor 162 may serve to mitigate the detrimental effects of low oxygen solubility at elevated temperatures (e.g., between 32° C. and 45° C.). In addition, the temperature data supplied by the temperature sensor 184 may be used to adjust the grey water pretreatment system 48, particularly any cooling features of the system 48 including direct and/or indirect heat exchangers such as fin-fan heat exchangers, shell-and-tube heat exchangers, psychrometric coolers, and the like. Similarly, the temperature of the incoming ASU oxygen 26 may be monitored via an additional temperature sensor 186, as the temperature of the ASU oxygen 26 may affect its solubility within the mixed liquor.

An analyzer 185 may be in fluid communication with the biological reactor 162, and may draw in a portion of the mixed liquor for continuous or intermittent analysis. By way of example, the analyzer 185 may include features for chemical and/or biological analyses to determine the activity of the biologics in the reactor 162, the nature of the reaction products produced by the action of the biologics on the pretreated grey water 50, the concentration of target components in the pretreated grey water 50, or any combination thereof. For example, chemical analysis features may include liquid and/or gas chromatographs, infrared spectrometers, ultraviolet/visible spectrometers, mass spectrometers, nuclear magnetic resonance spectrometers, electrophoresis equipment, thermogravimetric analyzers, atomic analyzers, or any combination of these and other similar equipment. Biological analysis features may include biological oxygen demand analyzers, polymerase chain reactors, biological analyzers (e.g., to determine/verify biological species), or any combination of these and other similar equipment. In embodiments where the analyzer 185 draws in or receives a test sample, the test sample, after analysis, may be vented from the analyzer 185 via a vent 187. Again, the analysis may be intermittent or continuous such that the vent 185 intermittently or continuously discharges a small amount of test material.

Using data from the analyzer 185, the controller 134 may determine the relative amounts of the air 164 and the ASU oxygen 26 that may be suitable for a particular time period of treating the pretreated grey water 50. Further, the analyzer 185 may also provide an indication as to the efficacy of the biological oxidation occurring within the reactor 162. In certain embodiments, the controller 134 may automatically adjust any one or a combination of parameters, including the flow rates, temperatures, and/or pressures, of the ASU oxygen 26, the air 164, and/or the pretreated grey water 50. Further, in embodiments where the controller 134, based on feedback from the analyzer 185, cannot automatically adjust a parameter (e.g., the type of active biologics in the reactor 162), the controller 134 may provide an indication to a user (e.g., a technician) that the system 160 requires attention.

In addition to the features noted above, certain of the sensors 136 may monitor outlet streams from the solids/liquids separation system 126. In the illustrated embodiment, a flow rate sensor 188 may monitor the flow rate of the removed solids 122 sent to the solids processing system 127. Additionally or alternatively, a flow rate sensor 190 may monitor the flow rate of the RAS 130 that is returned to the uncovered biological reactor 162. The flow rates provided by the sensors 188 and 190 may be useful in estimating the quantity of solid waste that is removed from the grey water blowdown 46. Such information may be useful for implementing upstream waste reduction processes, estimating total waste removal from the gasification system 12, estimating desirable microbe properties, and other adjustments that may be made to the operation of the uncovered biological reactor system 160 to improve waste removal efficiency.

Figure 4:
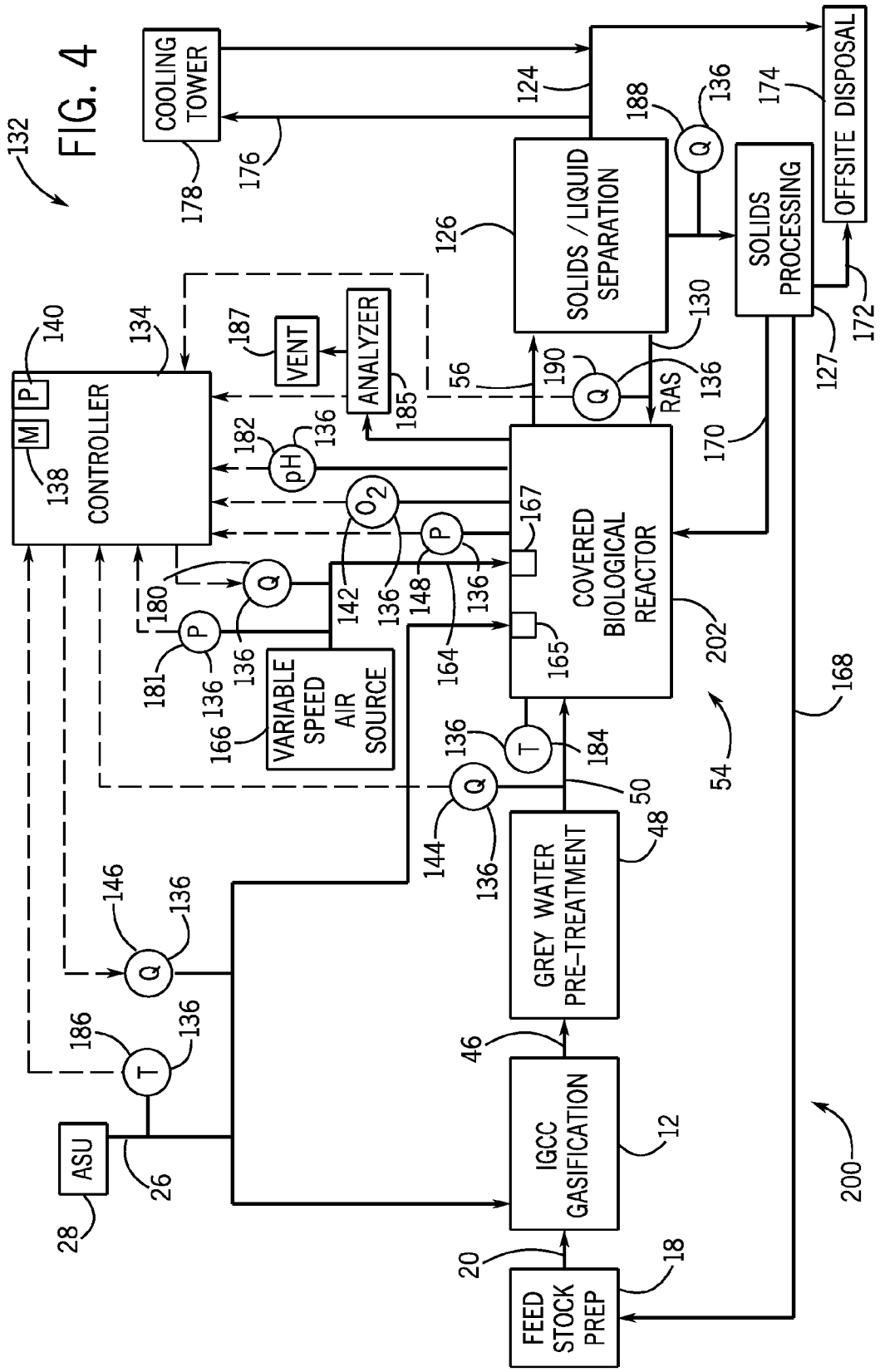
FIG. 4 is a schematic block diagram of an embodiment of the gasification grey water treatment system of FIG. 2, wherein the biological treatment system includes a covered biological reactor.

Moving now to FIG. 4, a schematic diagram of another embodiment of the water treatment system 120 is depicted. In the embodiment of FIG. 4, a covered biological reactor system 200 includes a number of features that have a similar or the same configuration as described above with respect to FIG. 3. Accordingly, those features are represented using the same reference numerals. The covered biological reactor system 200 includes a covered biological reactor 202, which may be a tank, vessel, drum, or any other fully contained structure capable of holding a pressure suitable for the biotreatment processes carried out by the biological media (or chemical oxidants where the reactor 202 is not biological). The use of a covered biological reactor 200 versus an uncovered biological reactor 162 may be desirable to enable enhanced control over the evolution and release of byproduct gases from the oxidation process.

In embodiments where the biological reactor 202 forms a mixed liquor, the mixed liquor may not be exposed to the surrounding air. In other words, evolved gases from the reactor processes remain trapped until they are vented, and the entire oxygen demand of the microbes may be delivered via the air 164 from the variable speed air source 166 and/or via the supply of the ASU oxygen 26. In a general sense, the covered biological reactor system 200 operates as described above with respect to the uncovered biological reactor system 160 in FIG. 3. Indeed, in a similar manner as described above with respect to FIG. 3, the covered biological reactor 200 may include one or more agitation features, such as an impeller, a screw conveyor, sonicators, various sparging equipment, or similar features. However, the covered biological reactor 200 may also include certain features that are not present within the uncovered biological reactor 162 of FIG. 3. For example, the covered biological reactor 200 may include one or more pressure release features, and may have a different material construction than the uncovered biological reactor 162 to support enhanced levels of gases and their associated byproducts (e.g., acids).

Further, because the covered biological reactor 202 is pressurized, the positive pressure therein may provide a continuous stream to the analyzer 185 for analysis. In addition, the vent 187 associated with the analyzer 185 may act as a release to bleed off excess pressure. In certain embodiments, the vent 187 may be positioned fluidly between the analyzer 185 and the covered biological reactor 200, such that the vent 187 enables the selective venting of evolved gases and analysis as desired. In still further embodiments, the analyzer 185 may not be present, and the vent 187 may provide a pressure release mechanism for the covered reactor 200.

As an example, in certain embodiments, the controller 134, as a result of feedback from the analyzer 185, may determine that the reactor 200 contains excessive amounts of volatile hydrocarbons. In response to such a determination, the controller 134 may cause the atmosphere in the covered biological reactor 200 to be purged by increasing the influx of air 164 while venting through the vent 187 (or another vent). As another example, the levels of CO2 and O2 in the atmosphere of the reactor 200 may be above a threshold value, at which the mixed liquor may become undesirably corrosive. In such situations, the controller 134 may cause at least a portion of the atmosphere within the reactor 200 to become replaced with the air 164, or increased levels of the ASU oxygen 26.

Figure 5:
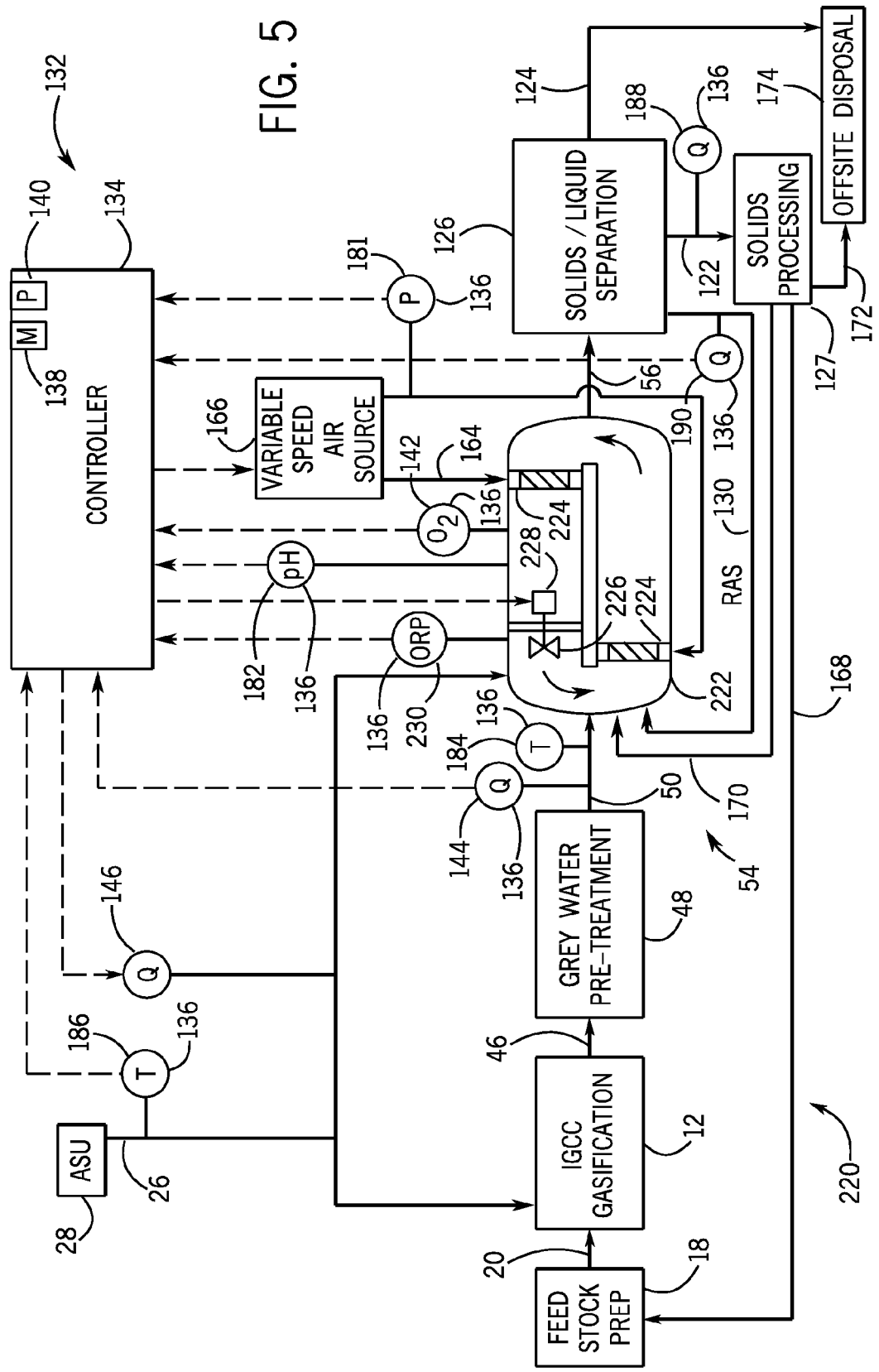
FIG. 5 is a schematic block diagram of an embodiment of the gasification grey water treatment system of FIG. 2, wherein the biological treatment system includes an agitated biological reactor.

As noted above, the reactors disclosed herein may include any one or a combination of agitation features, gas injection features, and the like. FIG. 5 is a schematic depiction of one embodiment of the water treatment system 120, in which the system includes an agitated biological reactor system 220. Particularly, the agitated biological reactor system 220 may include an agitated biological reactor 222 in which biological respiration occurs to oxidize the pretreated grey water 50. As above with the configuration described with respect to FIG. 4, the configuration in FIG. 5 includes many of the same features as described above with respect to FIG. 3. Accordingly, those features are illustrated using the same reference numerals.

The agitated biological reactor 222 of FIG. 5 may be in the form of a covered or uncovered reactor (as in FIGS. 3 and 4, respectively), and may include equipment within the reactor 222 to provide mixing energy to the mixed liquor. Enhanced mixing energy may be desirable to increase the interaction between the mixed liquor and the oxygen contained within the air and/or the ASU oxygen 26. As depicted, the air 164 may be provided via aerators 224, but other agitators may include coarse and/or fine bubble diffusers, jet mixers, Venturi mixers, or other such mixed liquor agitators. Again, diffusers, mixers, and the like may be mounted to a wall or floor surface of the agitated biological reactor 222 in any suitable manner. Further, the agitated biological reactor 222 may include mechanical agitators 226, such as a mechanical mixer (e.g., a mixer driven by a motor 228). The mechanical agitators 226 also may be mounted to a wall or floor surface of the reactor 222 or be moveable within the agitated biological reactor 222. The agitated biological reactor 222 may include multiple sources of air and mechanical agitation.

In addition to the sensors and various analysis features described above, the reactor 222 may also include one or more oxidation/reduction probes 230, which enable the controller 134 to measure the redox potential of the mixed liquor within the reactor 222. Such information may be useful in monitoring the progress of the oxidative processes in the reactor 222, and any adjustments that may be suitable as a result of such monitoring. For example, the controller 134 may adjust a retention time of the pretreated grey water 54 within the reactor 222, the flow of air 164 and/or the ASU oxygen 26 to the reactor 222, or any combination thereof, as a result of the monitored redox potential.

Technical effects of the invention include the integration of an air separation unit in a gasification system with wastewater treatment. Separated oxygen generated by the air separation unit may be utilized as a sole source of oxygen for oxidative treatment of the wastewater, or may be used in combination with other sources of oxygen, such as ambient or compressed air. The oxygen generated by the air separation unit may be used to trim peak oxygen demand during periods of high waste levels. The oxidative treatment processes that utilize the oxygen generated by the air separation unit may be chemical oxidation (e.g., using a chemical oxidant and the oxygen), biological (e.g., using microbes and the oxygen), or a combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gasification system, comprising:
   a gasification and scrubbing system configured to produce syngas and black water from at least a fuel source, water, and oxygen;
   a black water treatment system coupled to the gasification and scrubbing system, wherein the black water treatment system is configured to treat the black water to produce a grey water; and
   a grey water treatment system coupled to the black water treatment system and configured to receive the grey water, wherein the grey water treatment system comprises:
      a bioreactor comprising microbes configured to utilize oxygen to oxidize chemical species within the grey water to generate a treated grey water, wherein the oxygen utilized by the gasification and scrubbing system and the bioreactor is generated by an air separation unit (ASU) fluidly coupled to the gasification and scrubbing system and the bioreactor; and
      a controller configured to adjust an amount of the oxygen provided to the bioreactor based on a chemical oxygen demand (COD) of the grey water, a biological oxygen demand (BOD) of activated sludge within the bioreactor, or a combination thereof.

2. The system of claim 1, wherein the grey water treatment system comprises a biological treatment system, and wherein the biological treatment system comprises the bioreactor.

3. The system of claim 1, wherein the controller is configured to adjust a retention time of the grey water in the bioreactor based on the COD of the grey water, the BOD of activated sludge, or a combination thereof.

4. The system of claim 1, wherein the grey water treatment system comprises one or more membrane filtration units configured to separate the treated grey water from the microbes, and the controller is configured to control a flow of the treated grey water through the one or more membrane filtration units based on the COD of the grey water, the BOD of the activated sludge, or a combination thereof.

5. The system of claim 2, wherein the biological treatment system comprises a porous medium supporting the microbes, and the controller is configured to control a flow of the grey water through the porous medium based on the COD of the grey water, the BOD of the activated sludge, or a combination thereof.

6. The system of claim 1, comprising a heat exchanger disposed upstream of the bioreactor and configured to adjust a temperature of the grey water, wherein the controller is configured to adjust an operational parameter of the heat exchanger based on the COD of the grey water, the BOD of activated sludge, or a combination thereof.

7. The system of claim 1, wherein the bioreactor is configured to utilize air in addition to the oxygen, the air is provided to the bioreactor by an air blower, and the controller is configured to adjust an operational parameter of the air blower based on the COD of the grey water, the BOD of activated sludge, or a combination thereof.

8. A gasification system, comprising:
   a flow path that couples a gasification and scrubbing system and a grey water treatment system, wherein the flow path is configured to flow a grey water generated from a blowdown of the gasification and scrubbing system to the grey water treatment system;
   an air separation unit (ASU) that couples to the gasification and scrubbing system and to the grey water treatment system, wherein the ASU is configured to generate a first stream of separated oxygen utilized by the gasification and scrubbing system to produce a syngas and a second stream of separated oxygen utilized by the grey water treatment system to treat the grey water; and
   a controller configured to adjust an amount of the second stream of separated oxygen provided to a bioreactor within the grey water treatment system based on a chemical oxygen demand (COD) of the grey water to generate the treated grey water, a biological oxygen demand (BOD) of activated sludge within the bioreactor used to treat the grey water in the grey water treatment system, or a combination thereof, wherein the bioreactor comprises microbes configured to utilize the second stream of separated oxygen to oxidize chemical species in the grey water to generate the treated grey water.

9. The system of claim 8, wherein the bioreactor is an uncovered basin or a covered tank.

10. The system of claim 9, wherein the bioreactor comprises one or more diffusers or jet aerators configured to introduce the second stream of separated oxygen into the bioreactor, the one or more diffusers or jet aerators are mounted on a floor of the bioreactor, mounted on a side wall of the bioreactor, or any constructed as a part of a membrane support module of the bioreactor, or any combination thereof, and wherein the one or more diffusers or jet aerators are coarse bubble diffusers, fine bubble diffusers, or a combination thereof.

11. The system of claim 9, wherein the bioreactor comprises one or more agitators configured to mechanically agitate a mixture comprising the oxygen and the grey water.

12. The system of claim 9, wherein the bioreactor comprises one or more dissolved oxygen probes configured to enable a controller to monitor an oxygen concentration in the bioreactor.

13. The system of claim 9, wherein the grey water treatment system comprises one or more valves disposed along an oxygen flow path configured to deliver the second stream of separated oxygen to the bioreactor, and the one or more valves are configured to enable the controller to adjust the oxygen concentration on the bioreactor.

14. The system of claim 9, wherein the grey water treatment system comprises a biological treatment system having the bioreactor, and wherein the biological treatment system comprises a plurality of bioreactor cells containing the microbes residing on an attachment medium, a suspended growth system configured to generate a mixed liquor of the microbes and the grey water in the bioreactor, or an activated sludge system, or any combination thereof.

15. A method for gasification, comprising:
gasifying a fuel source using a first oxygen stream supplied from an air separation unit (ASU);
discharging a gasifier blowdown from a gasification and scrubbing system configured to gasify the fuel source;
generating a grey water from the gasifier blowdown; and
biologically treating the grey water in a bioreactor comprising microbes configured to utilize a second oxygen stream supplied by the ASU to generate a treated grey water and waste biosolids, wherein the fuel source comprises a blend of fuel and waste biosolids.

16. The method of claim 15, comprising adjusting an amount of the second oxygen stream provided to the bioreactor in response to feedback indicative of one or more monitored parameters of the grey water, in response to feedback indicative of one or more monitored parameters of a biological treatment system having the bioreactor, or a combination thereof.

17. The method of claim 16, wherein the one or more parameters comprise a temperature of the grey water, a concentration of the chemical species in the grey water, a reactivity of the chemical species, a solubility of the oxygen in the grey water, a biological oxygen demand, a chemical oxygen demand, or any combination thereof.

* * * * *